United States Patent [19]
von Rappard et al.

[11] Patent Number: 4,507,244
[45] Date of Patent: Mar. 26, 1985

[54] METHOD FOR CRYSTALLIZING A SUBSTANCE FROM A SOLUTION

[75] Inventors: Gerhard von Rappard, Bad Iburg; Jürgen Grundmann, Hilter, both of Fed. Rep. of Germany

[73] Assignee: Walter Rau Lebensmittelwerke GmbH & Co. KG, Fed. Rep. of Germany

[21] Appl. No.: 384,254

[22] Filed: Jun. 2, 1982

[51] Int. Cl.$^3$ ................................................ B01D 9/02
[52] U.S. Cl. .................. 260/428.5; 62/532; 23/299
[58] Field of Search ............. 426/601, 524; 23/295 R, 23/299; 260/428.5, 707; 62/532, 544

[56] References Cited

U.S. PATENT DOCUMENTS 2,619,421 11/1952 Greenfield ................ 260/428.5
3,628,917 12/1971 Nault .
4,129,583 12/1978 Zondek .................... 260/428.5
4,228,089 10/1980 Bischot et al. .............. 62/532
4,265,826 5/1981 Iida ........................ 62/532

OTHER PUBLICATIONS

Mullin, CRC Press 1972, pp. 259, 322–324, Cleveland, Ohio.
G. Matz, Kristallisation, 2,39,53 (1969).

Primary Examiner—Hiram H. Bernstein
Attorney, Agent, or Firm—Finnegan, Henderson, Farabow, Garrett & Dunner

[57] ABSTRACT

In the crystallization of a substance from a solution, in particular the crystallization of fats from a mother liquor containing solvents, the solution is rapidly cooled (I) to a temperature below the crystallization temperature. This supercooled and hence supersaturated solution begins to crystallize only after ca. 60 to 90 seconds, so that during this interval (II) it may be transferred to a retention tank in which crystallization takes place (III). This method may be carried out either quasi-continuously or continuously.

6 Claims, 3 Drawing Figures

METHOD FOR CRYSTALLIZING A SUBSTANCE FROM A SOLUTION

BACKGROUND OF THE INVENTION

1. Field of the Invention

The present invention relates to a method for crystallizing a substance from a solution by cooling.

2. Description of the Prior Art

In the production of fats, it is necessary to fractionate triglyceride mixtures and fatty acids. In the methods employed, the individual groups of components are separated from a solution by crystallization. The solvents used may be, for example, hexane, isopropanol, acetone, petroleum ethers or similar organic solvents.

The super-saturation necessary for the change of phase from liquid phase to crystallization phase may in principle be achieved by a change in the concentration, temperature or pressure of the solution, but in practice it is generally the temperature which is changed, i.e. the solution is cooled.

The heat is removed by convection in crystallizers equipped with stirrers which may in addition be equipped with special installations for classification of the crystals according to their particle sizes.

Since relatively little heat exchange takes place over the surface of such a crystallizer equipped with stirrer, it is quite customary to use crystallizers with a scratched heat exchange surface, so-called "scratched coolers", in which the heat transfer is much improved compared with that of convection coolers.

The crystallizers and scratched coolers used in particular for fat fractionating are designed to operate batchwise, with the result that only relatively long crystallization or dwell times of the order of ca. 30 minutes can be achieved. The maximum cooling rates obtainable are in the order of 80° C. per hour.

A further disadvantage of the known methods is that they cannot be operated continuously, i.e. the entire crystallization takes place in a container from which the crystallizing mass must be removed. Such discontinuous operation is disadvantageous for technical reasons related to the process.

Lastly, the crystals produced by the known methods are irregular in shape so that the filtration which must subsequently be carried out often leads to technical problems.

SUMMARY OF THE INVENTION

An object of the present invention is to provide a method for the crystallization of a substance from a solution by cooling in which the disadvantages mentioned above do not occur.

It is intended in particular to propose a method in which the operating times required are substantially reduced and continuous operation is possible.

According to the present invention, there is provided a method for crystallizing a substance from a solution by cooling, wherein the solution is rapidly cooled to a temperature below the crystallization temperature, and the supercooled, and hence supersaturated but not yet crystallizing solution, is transferred to a retention tank, where crystallization takes place.

According to a further aspect of the present invention, there is provided an apparatus for crystallizing a substance from a solution by cooling. The apparatus comprises a cooling tank connected with a vacuum pump, for rapidly cooling the solution to a temperature below the crystallization temperature and a pump for transferring the supercooled, and hence supersaturated but not yet crystallizing solution, from the cooling tank to a retention tank where crystallization takes place.

Advantages achieved with the invention are based on the following consideration: when the various steps determining the velocity of crystallization of fats from mother liquors containing solvents were investigated, it was found that the velocity of the whole process depended substantially on the removal of heat of solution by cooling surfaces. Since the size of the cooling surfaces cannot be increased indefinitely, there is therefore a lower limit to the rate of removal of heat of solution and hence a limit to the velocity of the whole process, with the result that crystallization or dwell times of the order of 30 minutes to one hour are required.

With a view to improving the rate of cooling, experiments were carried out with evaporation cooling at reduced pressure, which enabled cooling rates of 500° C. per hour to 1000° C. per hour to be achieved.

At these high cooling velocities, the following observations were made: if the mother liquor is cooled to a temperature below the equilibrium crystallization temperature, the supercooled and hence supersaturated mother liquor remains in this state for ca. 60 to 90 seconds without any crystals forming. After expiry of this interval of time, rapid crystallization sets in which breaks down the supersaturation, and the suspension becomes heated by the heat of crystallization released.

Since no crystals form during the supercooling phase of the mother liquor, the solution may be removed from the cooler by means of a suitable pump. Thus, it is possible to operate such an evaporation crystallizer continuously instead of only batchwise.

In this method, it is essential to bring the mother liquor rapidly to the supercooled state in which a crystal-free phase occurs. This may easily be achieved by evaporation cooling.

This method results in relatively short dwell times of the order of ca. one minute in the cooling apparatus proper, after which the supercooled and hence supersaturated but not yet crystallizing mother liquor is removed and transferred to a conventional container in which crystallization proper takes place. The dwell time in this crystallization vessel is ca. 5 minutes, so that the overall operating time is 6 to 8 minutes.

This must be compared with the dwell times of at least 30 minutes which are required in a scratched cooler.

Moreover, the short dwell times of the mother liquor in the cooling apparatus proper and its consequent transfer into the crystallization apparatus at short time intervals enables installations with small dwell time volumes to be used, so that the overall size of the cooling apparatus and crystallization apparatus can be substantially reduced.

The short dwell times also result in short pathways along the control systems, which is advantageous for controlling the process since it enables any changes in the operating parameters to be carried out very rapidly.

Crystallization of the supercooled solution is advantageously carried out adiabatically so that the heat of crystallization produced is not carried to the outside but used to heat the mother liquor, thereby influencing the velocity of diffusion and hence the velocity of crystallization.

This has the overall effect of linearizing crystal growth, which in turn has an advantageous effect on the form of the crystals. It enables ideally spherical crystals measuring 0.1 mm to be obtained, which can be separated from the mother liquor by simple filtration.

BRIEF DESCRIPTION OF THE DRAWING

Embodiments of the present invention are described below by way of example with reference to the accompanying drawings, wherein.

DESCRIPTION OF THE PREFERRED EMBODIMENTS

Figure 1:
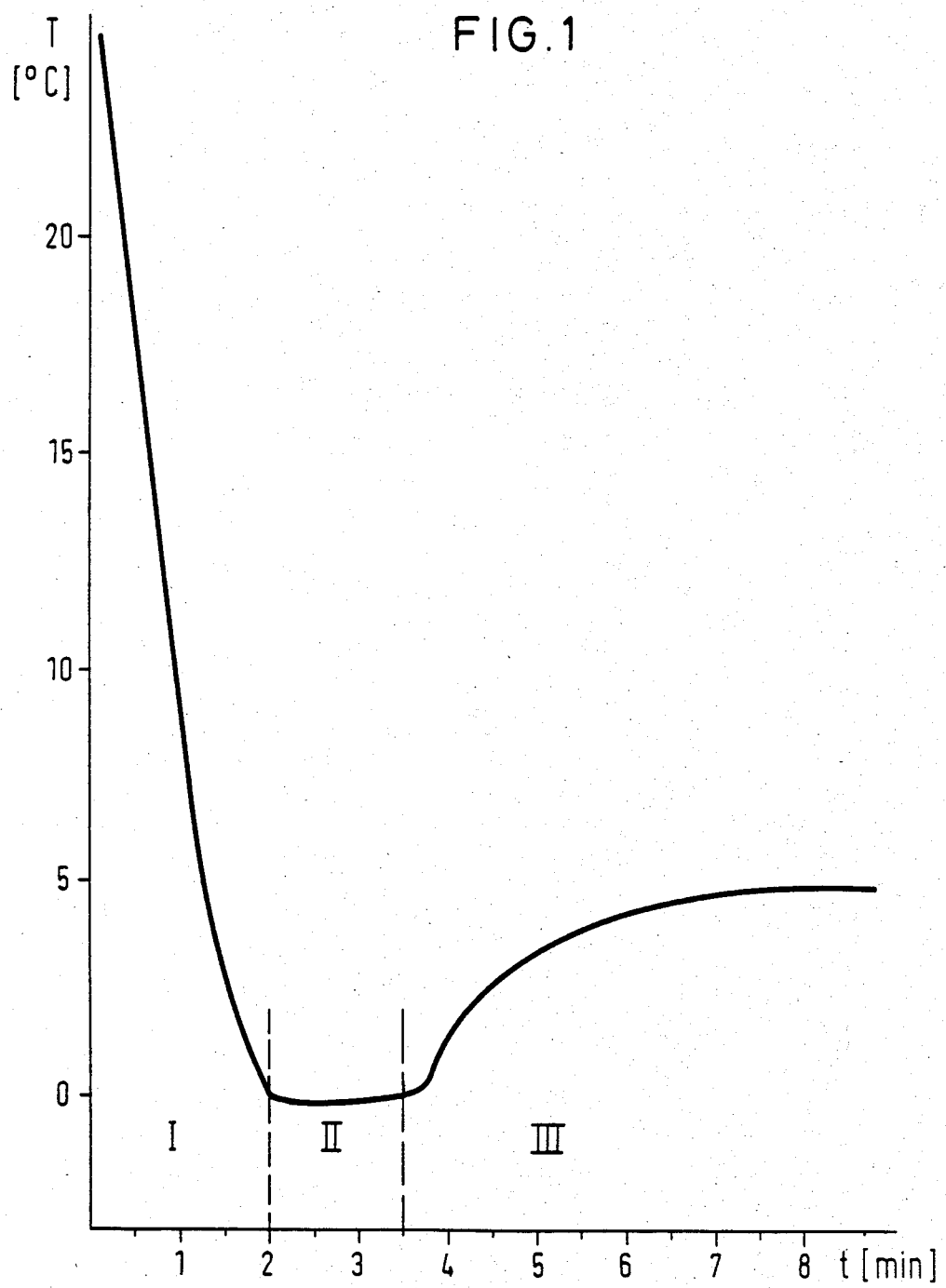
FIG. 1 is a temperature/time diagram representing cooling, supercooling and subsequent crystallization of a fat-mother liquor using acetone as solvent.

FIG. 1 shows the temperature/time diagram for cooling a mother liquor containing acetone as solvent and a usual fat mixture.

In area I, the mother liquor is cooled at a rate of ca. 750° C. per hour to a temperature of ca. 0° C., which is approximately 5° C. below the crystallization equilibrium temperature. In this supercooled and hence supersaturated state, no crystals form for approximately 60 to 90 seconds, so that the supersaturated mother liquor can easily be pumped off, and in particular, without any risk of damage to the delicate fat crystals (area II).

After this time interval of ca. 60 to 90 seconds, rapid crystallization sets in spontaneously and breaks down the supersaturation. If this crystallization takes place in an adiabatic container, that is to say without heat exchange with the surroundings, the heat of crystallization released heats up the mother liquor until finally, at the end of area III, it reaches an equilibrium temperature at the final temperature of crystallization, which in the example of FIG. 1 is approximately 5° C.

FIG. 1 also shows that approximately 2 minutes are required for cooling the mother liquor in area I from the process temperature to the supercooling temperature. The final equilibrium temperature, at which substantially all the fat crystals have completely crystallized, is reached after a further period of approximately 5 minutes.

These figures are based on a cooling rate of 750° C. per hour, which means that even shorter times can be achieved at higher cooling rates.

Figure 2:
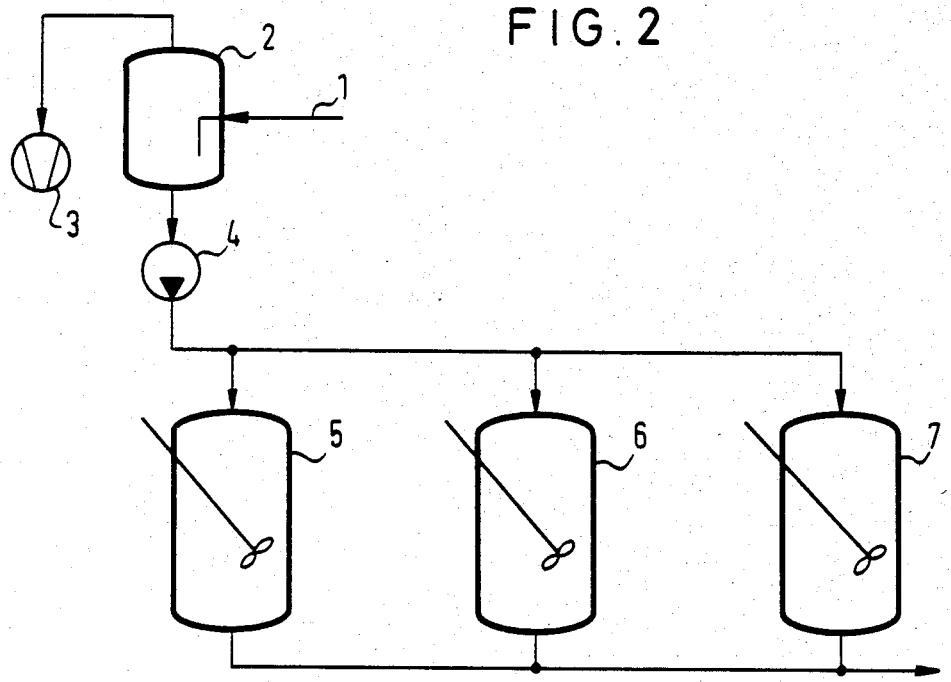
FIG. 2 is a basic schematic representation of a first embodiment of an apparatus for carrying out such a method.

FIG. 2 represents a quasi-continuous system for carrying out such a method. The mother liquor, a solution of fats in a solvent, e.g. acetone, is supplied from a feedpipe 1. A vacuum pump 3 is connected to the tank 2 to suck-off the vapours, condense them and optionally return them to the process. A cooling rate, as defined above, of ca. 500° to 1000° C. per hour can thereby be achieved, so that the mother liquor is cooled to a temperature approximately 2° to 5° C. below the crystallization temperature in approximately 1 to 2 minutes.

As soon as the whole mother liquor has reached this supercooled and supersaturated state, it is pumped by a pump 4 into three retention tanks 5, 6 and 7 in which crystallization proper takes place.

The various retention tanks 5, 6 and 7 are charged successively. The crystallizing mother liquor remains in these tanks 5, 6 and 7 for approximately 5 minutes and the crystallizing mass is then discharged from the tanks and carried away for further processing.

Figure 3:
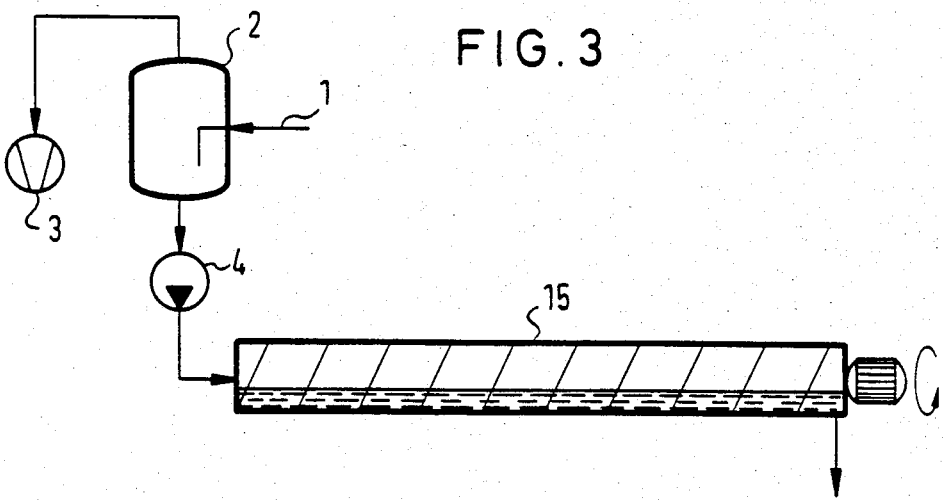
FIG. 3 is a schematic representation of a second embodiment of an apparatus for carrying out such a method.

FIG. 3 illustrates an embodiment which differs from that of FIG. 2 in that instead of the individual tanks 5, 6 and 7 which are charged in succession, one retention tube 15 is used, which operates on the principle of the Archimedean screw and is rotated about its longitudinal axis by a drive motor. A screw is indicated schematically in the interior of the retention tube 15.

While this tube 15 is continuously charged by the pump 4, the fats in the mother liquor can crystallize in the tube 15 and at the same time are continuously carried forward to be discharged as a crystallizing mass in the direction of the arrow shown at the righthand end in FIG. 3.

Crystallization is carried out adiabatically in the various retention vessels 5, 6, 7 and 15, that is to say, without heat exchange with the surroundings, so that the heat of crystallization liberated is returned to the mother liquor.

If 10 t of an acetone/fat mixture per hour are to be processed by a conventional crystallization process, for example, using a scratched cooler, the cooler is required to have a capacity of 10 t.

In the embodiment shown in FIG. 2, on the other hand, the cooler has a capacity of 166 kg, i.e. this technically and structurally complicated apparatus has only approximately 16% of the volume of the corresponding known apparatus.

The retention tanks 5, 6 and 7 can each take up 1.33 tonnes. These tanks, however, make no technical demands and give rise to no difficulties.

The vacuum pump 3 should have a suction capacity of approximately 6000 m$^3$ per hour at 0° C. Such a pump is available commercially.

From the above comparison, it is clear that an installation operating by the method according to the present invention provides substantial advantages in investment and operating costs compared with conventional crystallization systems.

What is claimed is:

1. A method for crystallizing a substance from a solution by cooling, including the steps of:
   (a) rapidly cooling the solution at a rate of at least 500° C. per hour by evaporation cooling at reduced pressure to a temperature below the crystallization temperature, the solution being a mother liquor containing solvents and the substance including fats,
   (b) transferring the supercooled, and hence supersaturated but not yet crystallizing, solution to a retention tank within approximately the first 60 to 90 seconds from the time the solution reaches the below crystallization temperature, and
   (c) subsequently adiabatically crystallizing the solution in the retention tank.

2. A method according to claim 1, wherein cooling is carried out at a rate of ca. 750° C. per hour.

3. A method according to claim 1, wherein the solution is cooled to a temperature approximately 2° to 10° C. below the crystallization temperature.

4. A method according to claim 1, wherein the solution is cooled to a temperature approximately 5° C. below the crystallization temperature.

5. A method according to claim 2, wherein said solution is cooled to a temperature approximately 2° to 10° C. below the crystallization temperature.

6. A method according to claim 2, wherein the solution is cooled to a temperature approximately 5° C. below the crystallization temperature.

* * * * *